United States Patent [19]

VanderPol

[11] Patent Number: 4,754,672

[45] Date of Patent: Jul. 5, 1988

[54] SEGMENTED SLIDING BEARING ARRANGEMENT FOR PORTABLE LATHE

[75] Inventor: Jerald VanderPol, Eldorado Hills, Calif.

[73] Assignee: Tri Tool Inc, Rancho Cordova, Calif.

[21] Appl. No.: 33,738

[22] Filed: Apr. 3, 1987

[51] Int. Cl.$^4$ .............................................. B23B 5/08
[52] U.S. Cl. ...................................... 82/4 C; 82/4 R; 384/248; 384/249
[58] Field of Search ........................... 82/4 C, 4 R, 30; 384/249, 264, 248, 263; 30/95, 96, 97

[56] References Cited

U.S. PATENT DOCUMENTS

| | | | |
|---|---|---|---|
| 1,109,049 | 9/1914 | Dunn | 384/264 |
| 1,356,561 | 10/1920 | Sanford | 384/264 |
| 1,503,459 | 7/1924 | Overn | 384/264 |
| 4,397,202 | 8/1983 | Mayfield | 82/4 C |
| 4,418,591 | 12/1983 | Astle . | |
| 4,483,522 | 11/1984 | Nail et al. . | |
| 4,631,995 | 12/1986 | Vroenen | 82/30 |
| 4,665,782 | 5/1987 | VanderPol | 82/4 C |

Primary Examiner—Frederick R. Schmidt
Assistant Examiner—Blynn Shideler
Attorney, Agent, or Firm—Bacon & Thomas

[57] ABSTRACT

A portable lathe tool includes fixed and rotating split rings, the fixed ring arranged to be secured to a pipe workpiece, the rotating ring being relatively rotatable with respect thereto for carrying a tool capable of performing a machining operation on the workpiece as it is driven around the circumference of the latter. A bearing arrangement for supporting the relatively rotating ring on the fixed ring is disclosed as having a plurality of discreet, circumferentially spaced bearing segments, each having converging radial and thrust bearing surfaces for engaging the rear end area of the rotating ring for axially, radially and rotationally locating and guiding the rotating ring relative to the fixed ring. An adjustment system is provided for accurately locating and adjusting the position of each of the bearing segments ring relative to the fixed ring to permit compensation for wear and dimensional variations.

4 Claims, 6 Drawing Sheets

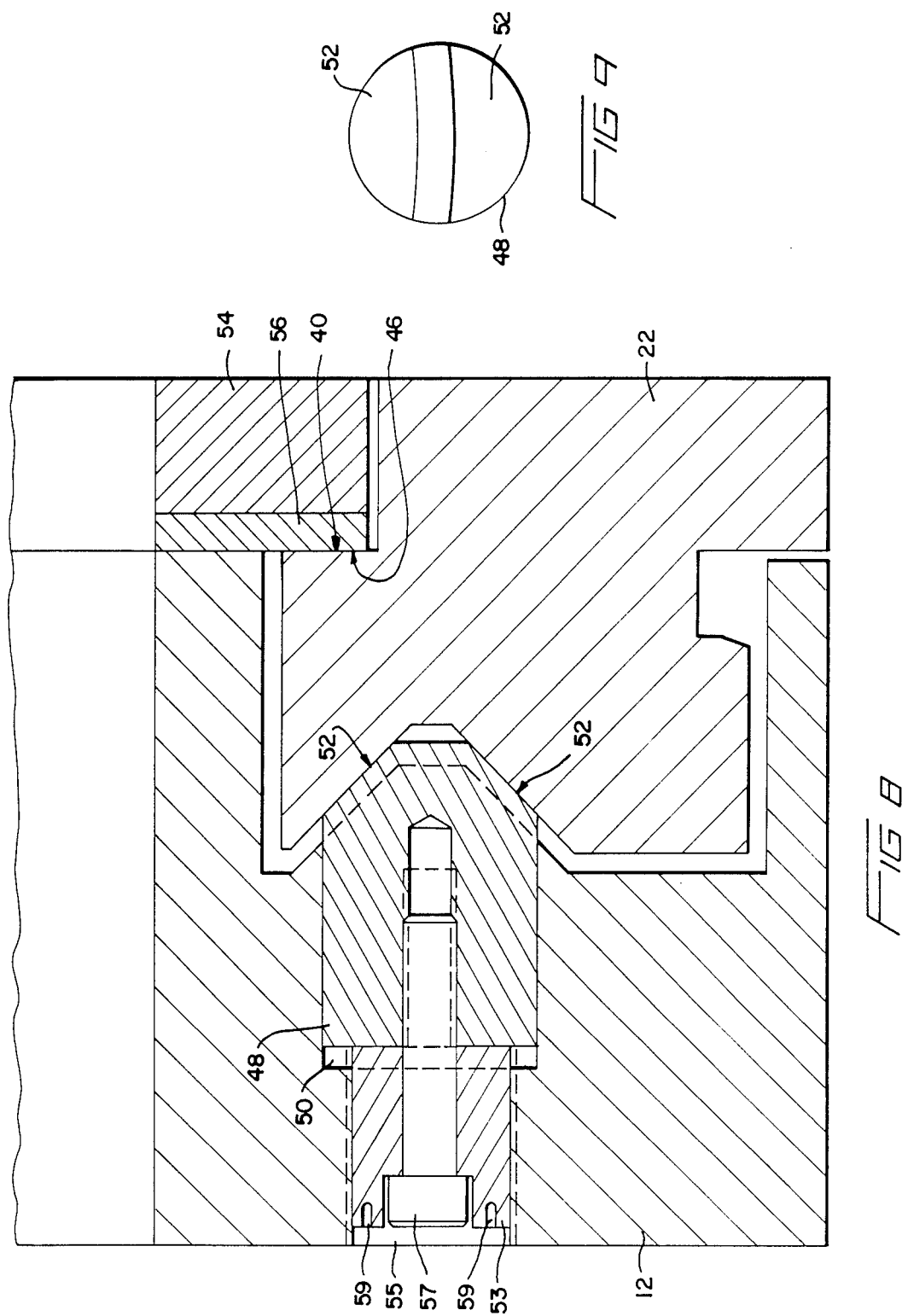

SEGMENTED SLIDING BEARING ARRANGEMENT FOR PORTABLE LATHE

RELATED APPLICATIONS

U.S. patent application Ser. No. 817,094 to VanderPol filed on Jan. 8, 1986.

BACKGROUND OF THE INVENTION

This invention relates to portable lathes and in particular to a bearing arrangement for a portable lathe.

Portable lathes of the type utilized with this invention are described, for example, in U.S. Pat. No. 4,418,591 and British Pat. No. 1,450,774, published on Sept. 29, 1976. A rotary bearing arrangement for the tool carrying head of the lathe is disclosed in the U.S. patent, while a ring with a sliding bearing surface is disclosed in the British patent.

With the fixed ring bearing arrangement, such as is disclosed in the British patent, it is difficult or impossible to compensate for wear between the relatively sliding elements constituting the bearing surfaces for the tool head. Moreover, accommodation of dimensional tolerance variations is problematic due to the fact that the various bearing elements are relatively fixed in an axial sense relative to each other.

BRIEF SUMMARY OF THE INVENTION

The present invention provides an improved bearing arrangement for a rotary tool head of a portable lathe. In particular, the invention provides a segmented sliding bearing arrangement with an adjustment system to permit each of the bearing segments to be independently axially adjusted to accommodate for wear and to more precisely locate the rotating ring portion of the tool relative to the relatively fixed, workpiece engaging portion of the tool.

More specifically, the present invention provides such an adjusting system for precisely locating the bearing segments relative to the tool head and the fixed tool structure so that the relatively rotating tool head can be precisely located and guided in axial, radial and rotational directions relative to the fixed tool housing.

BRIEF DESCRIPTION OF THE DRAWINGS

With reference to the appended drawings:

FIG. 8 is an enlarged partial sectional view showing a bearing segment in detail; and FIG. 9 is a front view of a bearing segment according to the invention.

DETAILED DESCRIPTION OF THE PREFERRED EMBODIMENT

Figure 1:
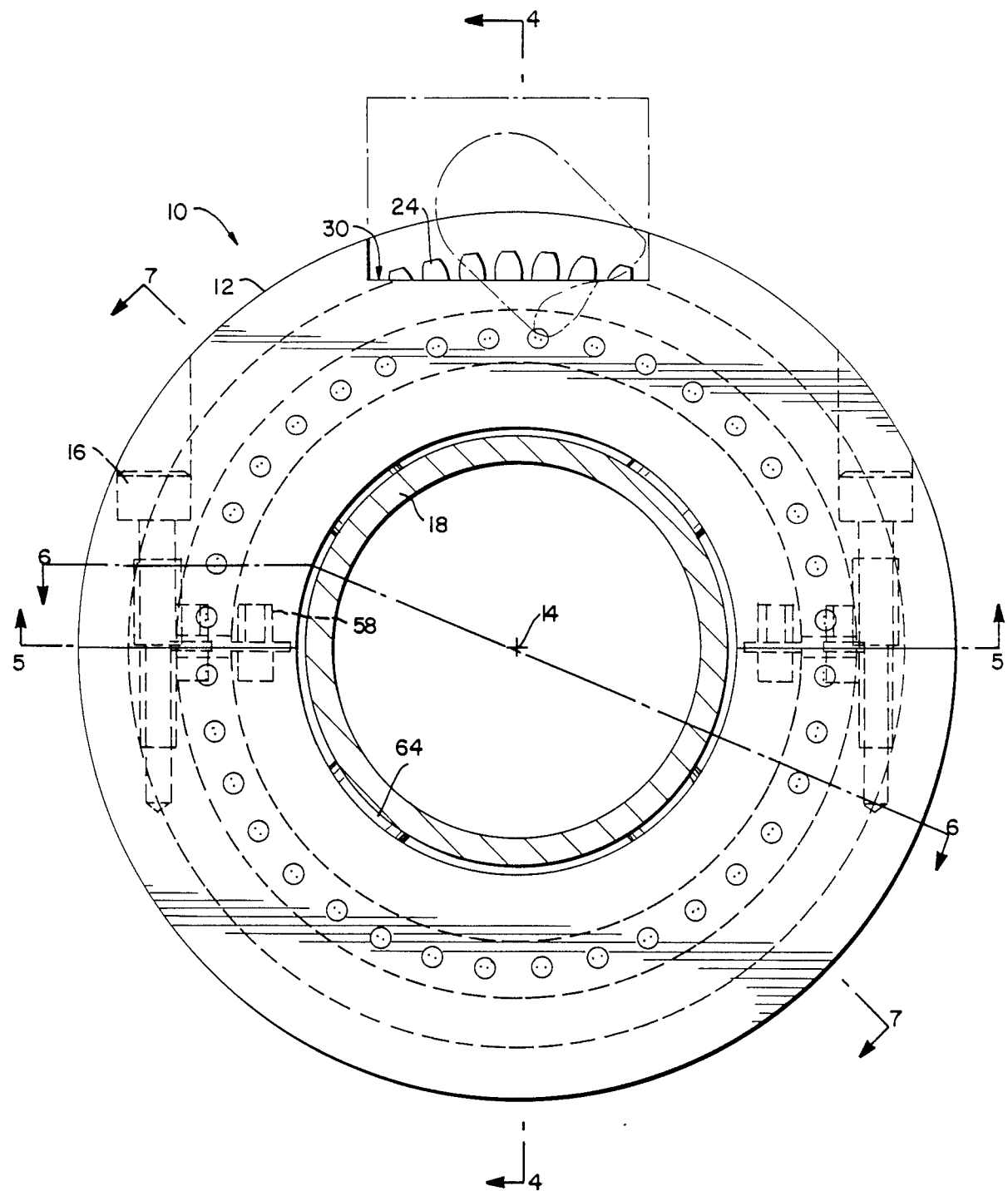
FIG. 1 shows a rear elevation view of a portable lathe embodying the invention.
Figure 2:
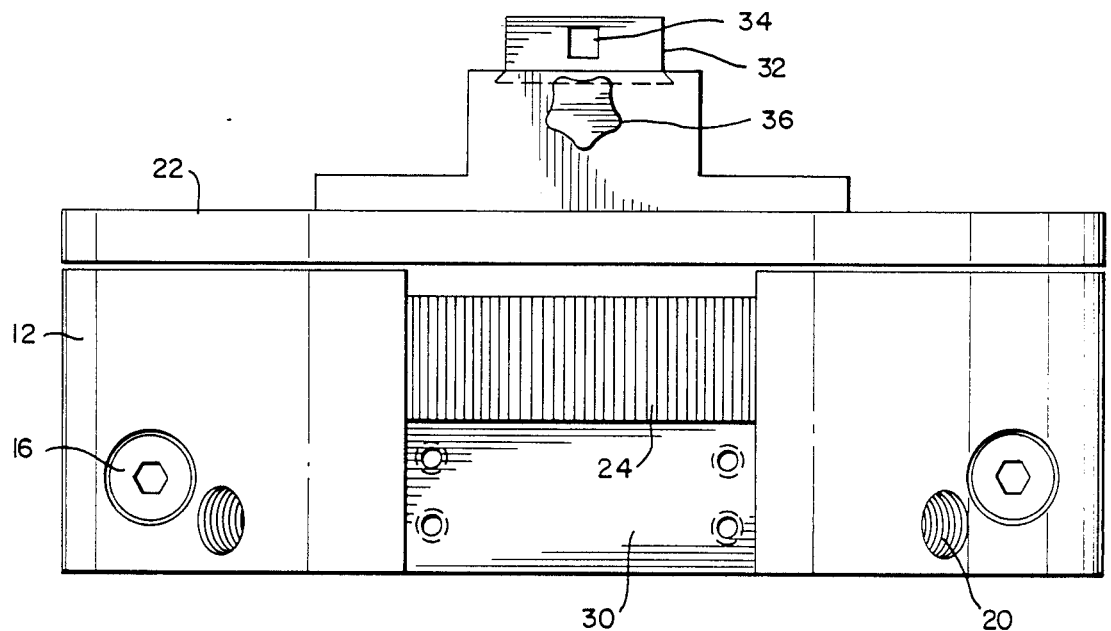
FIG. 2 is a plan view of the invention taken from the top of FIG. 1.
Figure 5:
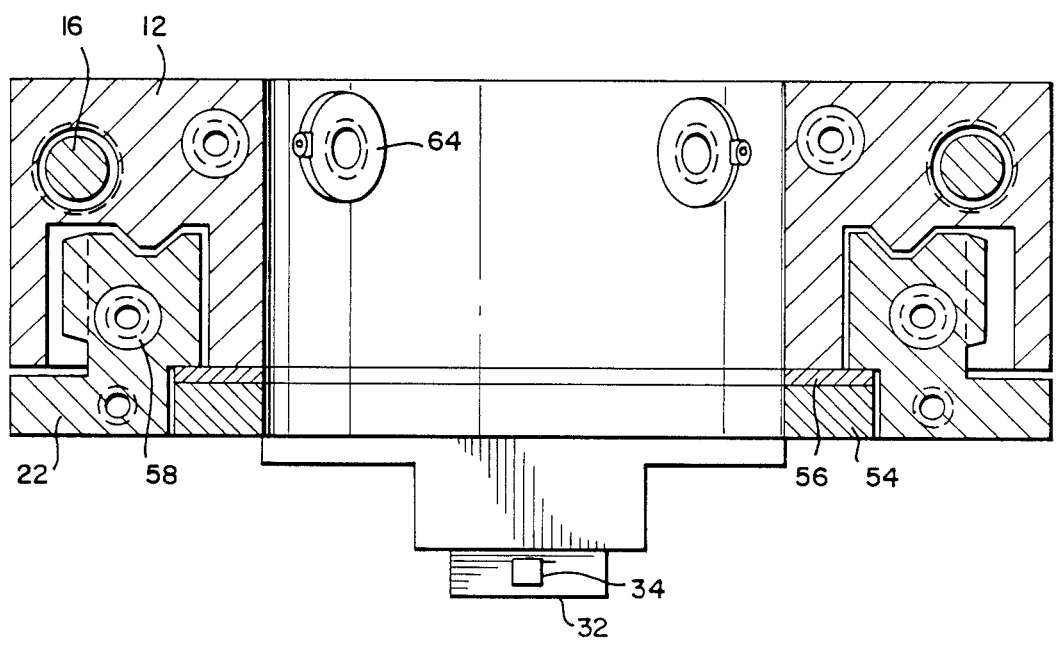
FIG. 5 is a sectional view taken along line 5—5 of FIG. 1.
Figure 3:
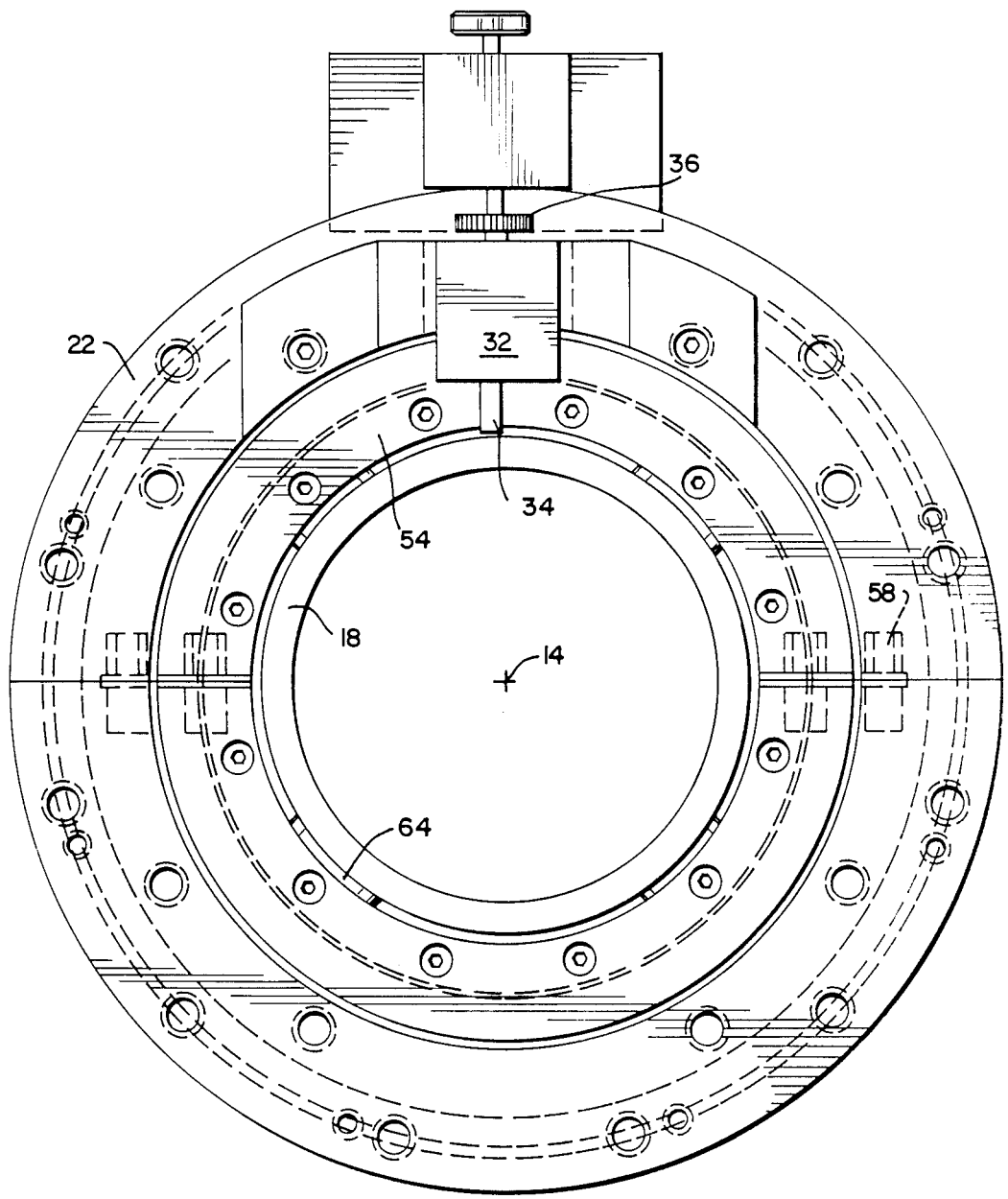
FIG. 3 is a front elevation view of the lathe shown in FIG. 1.

With reference to the drawings, FIGS. 1-3 show a portable lathe 10 embodying the invention to be more particularly described below. As shown in these views, the lathe comprises a first or fixed annular ring 12 having a longitudinal central axis 14. The ring 12 is divided in two halves normally retained together by suitable hinge and fastener means such as are generally illustrated at 16. These are generally conventional in portable lathes for permitting the tool to be diametrically split and placed over a pipe 18 in preparing a machining operation on the pipe. The pipe 18 is normally disposed centrally along the axis 14 and retained within the fixed ring 12 by clamping pads 64 that will be more particularly described below with reference to FIG. 7. In FIG. 2, threaded apertures 20 are shown for receiving conventional actuating bolts for engaging pads that are disposed around the periphery of fixed ring member 12 for locating and centering the workpiece relative to the fixed ring member 12.

Figure 4:
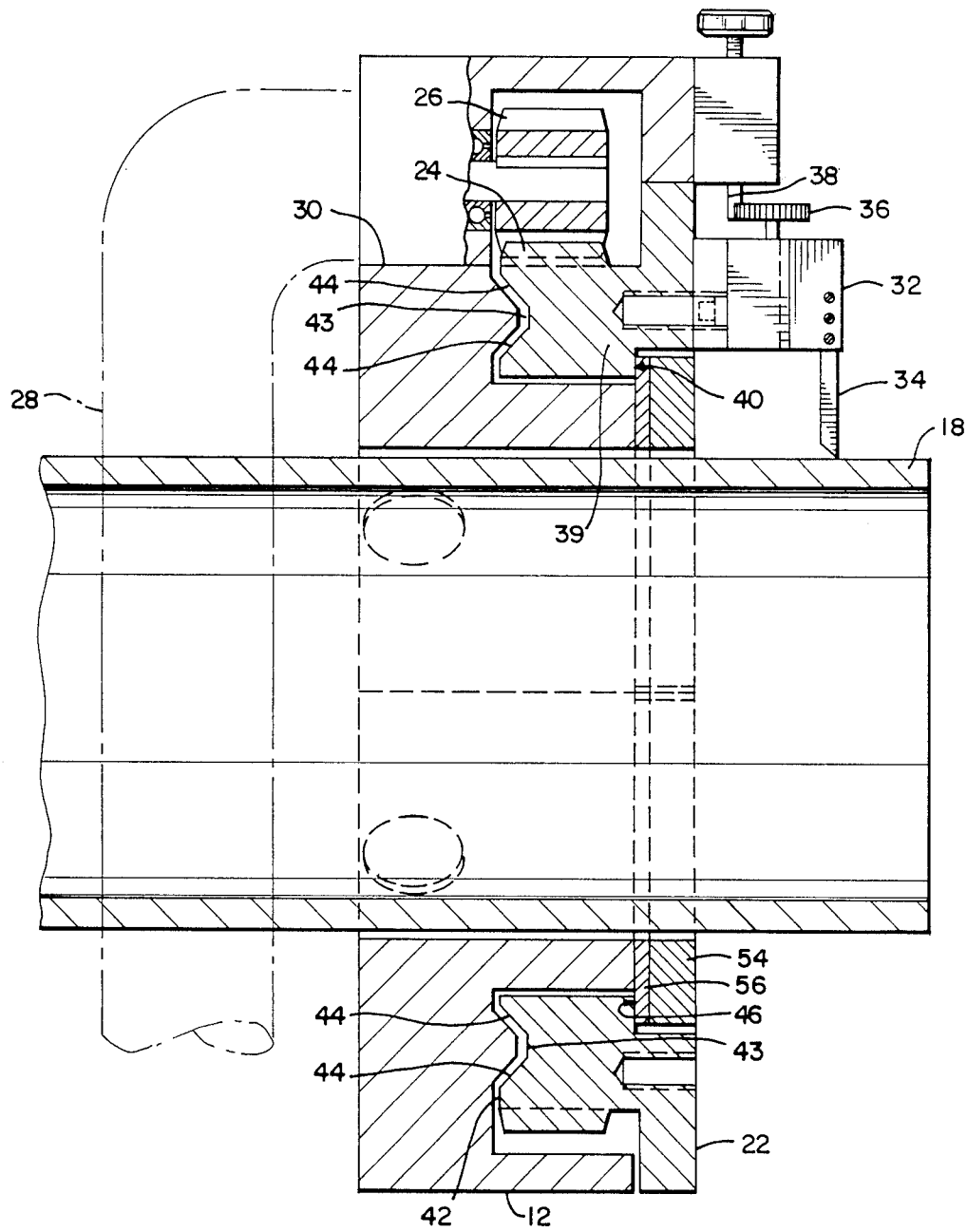
FIG. 4 is a sectional view taken along line 4—4 of FIG. 1.
Figure 6:
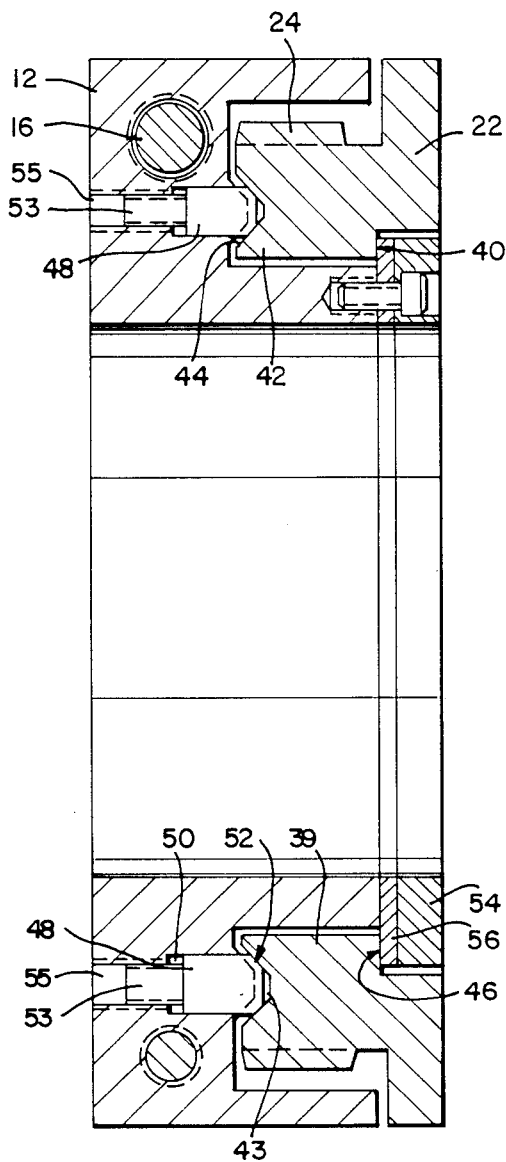
FIG. 6 is a sectional view taken along line 6—6 of FIG. 1.

As shown in FIG. 4, a second or rotating annular ring member 22 (referred to as the rotating tool head in the art) is rotatably mounted on fixed ring member 12 and includes outer gear teeth 24 engagable with pinion 26 of drive motor 28 normally mounted on ring 12 at mounting area 30 in FIGS. 1 and 2. The drive motor is only schematically illustrated in FIG. 4 to show its overall relationship with the portable lathe. Rotating ring member 22 includes a central longitudinal axis that is coincident with axis 14 so that the second ring 22 rotates concentrically relative to fixed ring 12.

A suitable tool carrier 32 is normally fastened to the forward face (towards the right as shown in FIG. 4) of rotating ring 22 and includes appropriate known means for securing and feeding a tool bit 34 relative to the rotating ring 22 for carrying out turning operations on a pipe workpiece 18 centrally located within the annular openings of the rings 12, 22. The feed means for the tool bit 34, for example, can comprise a conventional star wheel 36 that engages a relatively fixed pin 38 mounted on fixed ring 12. Such tool carrier and feed systems are generally conventional and do not constitute per se a material part of the present invention.

The rotating ring 22 includes forward and rearward portions 39, 42, respectively, with the rearward portion 42 defining an annular groove 43 including generally converging bearing surfaces 44 which are inclined relative to the axis 14. The angle of inclination of bearing surfaces 44 may be on the order of 45° with respect to axis 14, although other angles may be used without exceeding the scope of this invention. Forward portion 39 includes a forward bearing surface 40 cooperating with a bearing surface 46 for locating and guiding the ring 22 relative to fixed ring 12 in an axially forward direction.

A plurality of sliding bearing segments 48 are equidistantly spaced in a generally circular array on the fixed ring 12 such that they slidingly contact the bearing surfaces 44 of the annular groove 43. Each of the segments 48 is axially slidably retained in a forwardly facing opening 50 formed in the fixed ring 12 and has inclined converging radial and thrust bearing surfaces 52 formed on the forward end. An adjusting collar 53 is threadingly engaged with rearward facing opening 55 and is associated with each bearing segment 48. Bolt 57 (see FIG. 8) passes through collar 53 and is threadingly engaged with an opening formed in each of the bearing segments 48. Bolt 57 may be an Allen head capscrew or the like. Each of the bearing segments 48 has a tapered forward portion, the inclined tapered surfaces 52 corresponding in orientation to the bearing surfaces 44 such that each of the bearing segments slidably supports the rotating ring 22 with respect to the fixed ring 12. The adjusting collars 53 can individually be utilized to accurately adjust the position of bearing segments 48, which, in turn, adjust the position of rotating ring 22. Also, the inclined converging front portions of the bearing segments 48 which bear against the bearing surfaces 44 of groove 43 may be adjusted as these surfaces wear to maintain the accurate concentricity of ring 22 about axis 14.

Each of the adjusting collars 53 may have a pair of indentations 59 formed in their rearward surface which may be engaged by a wrench or other suitable means. The wrench is utilized to rotate the adjusting collars 53 in the threaded opening 55 so as to move them axially generally parallel to axis 14. By loosening bolt 57 and rotating adjusting collar 53, the axial position of the bearing segment may be adjusted. Once the segment is located in the desired position, bolt 57 may be tightened to lock the segment 48. The interengagement of converging radial and thrust bearing surfaces 52 with converging bearing surfaces 44 serves to accurately locate rotating ring 22 in both axial and radial directions.

The thurst bearing surface 46 of fixed ring 12 preferably is provided on or associated with a stop ring member 54 which may include an integral thrust bearing surface 46 or such bearing surface 46 may be provided on a separate ring bearing element 56.

The rotating ring 22, like ring 12, is divided into at least two halves retained by appropriate fastener means at 58. All other ring elements, for example rings 48, 54 and 56, are likewise split so that the entire lathe assembly can be opened for placement over a continuous pipe workpiece in a conventional manner.

In operation, adjusting collars 53 are normally rotated to advance bearing segments 48 forwardly so that bearing surfaces 44 and 52 engage each other to position rotating ring 22 axially and radially relative to fixed ring 12 and to advance the forward thrust bearing surface 40 until it engages thrust bearing surface 46 in sliding relationship. It will be apparent that the positions of bearing segments 48 can be adjusted at will to accommodate wear and dimensional variations as well as thermal conditions.

Rotation of rotary ring 22 relative to fixed ring 12 will now occur with the thrust bearing surfaces 46, 40 serving to locate ring 22 in an axially forward direction, while mating bearing surfaces 44, 52 serve to locate the ring 22 in axially rearward, rotational and radial directions.

Figure 7:
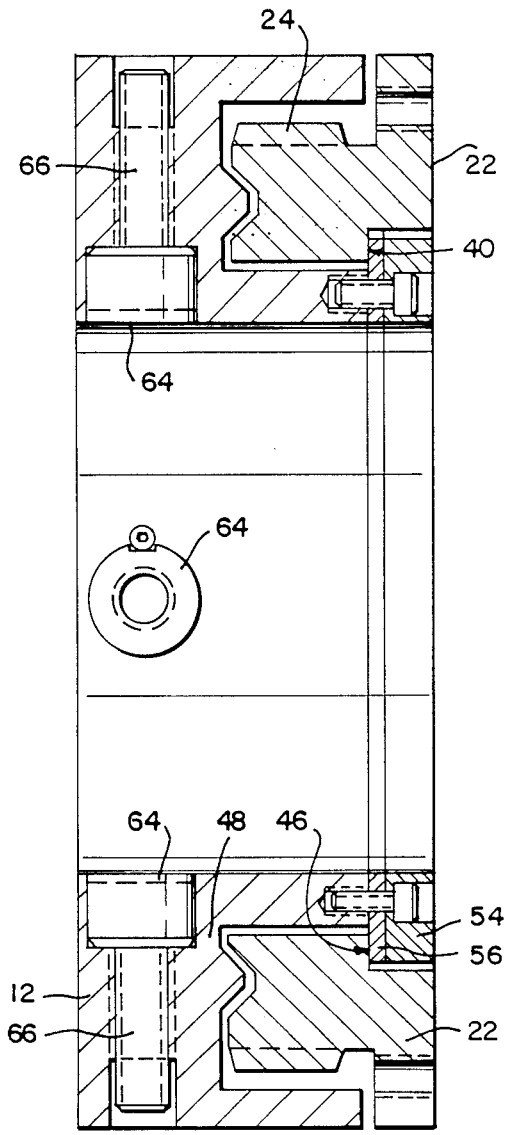
FIG. 7 is a sectional view taken along line 7—7 of FIG. 1.

As seen in FIG. 7, mounting pads 64 are mounted on fixed ring 12 by threaded bolts 66. The mounting pads are generally conventional and are arranged to precisely locate ring 12 on a tubular type workpiece disposed within the annulus of ring 12 so that axis 14 of the ring is generally colinear with such a workpiece and is rigidly secured relative thereto so that a machining operation can be carried out on the workpiece in a precise manner.

The various bearing surfaces described herein may be formed from self-lubricating, lubricant-impregnated material or may be formed of precision machined surfaces that are provided with a suitable source of lubricant.

While a preferred embodiment of the invention has been described and illustrated herein, it is to be understood that the same has been provided as an illustration of the preferred embodiment and is not intended to be limiting in any respect of the scope of the invention, which is defined in the claims herein below.

What is claimed is:

1. A portable lathe tool comprising:
   a first ring member having a central longitudinal axis and axially opposed ends;
   a second ring member having a central longitudinal axis concentric with the longitudinal axis of said first ring member and mounted on one of said opposed ends of said first ring member for rotation relative thereto about the central axis of the second ring member, the latter having axially opposed forward and rearward end portions;
   adjustable bearing means for locating and guiding said second ring member relative to the first ring member in axial, radial and rotational directions;
   said adjustable bearing means comprising circumferentially spaced bearing segments on said first ring member disposed adjacent the rear end portion of second ring member each bearing segment having an axis of rotation;
   each of said bearing segments defining inclined radial and thrust bearing surfaces converging toward the axis of rotation on the forward ends that engage, locate and guide the rear end portion of said second ring member in axial, radial and rotational direction, said rearward end portion of said second ring member defining a radial and thrust bearing surface corresponding in configuration to said bearing segments converging radial and thrust bearing surfaces;
   means for axially moving each bearing segment along the longitudinal axis of the first ring member in at least a forward direction and for rotationally adjusting each bearing segment about its own axis of rotation;
   said second ring member including a forward thrust bearing surface;
   said first ring member including a forward thrust bearing surface corresponding in configuration and shape to said second ring member forward thrust bearing surface;
   engaging ones of said forward thrust bearing surfaces of said first and second ring members limiting axial movement of said bearing segments at least in an axial forward direction.

2. A portable lathe tool is claimed in claim 1 wherein said spaced bearing segments are arranged in a substantially annular array.

3. A portable lathe tool as claimed in claim 2, wherein said means for positively moving the bearing segments axially forwardly comprises adjusting collars.

4. A portable lathe tool as claimed in claim 3, wherein said adjusting collars comprises threaded elements mounted on the first ring member in an annular array around the longitudinal axis of the first ring member.

* * * * *